Oct. 10, 1950     C. M. CARSON     2,525,649
PACKAGING
Filed March 15, 1948
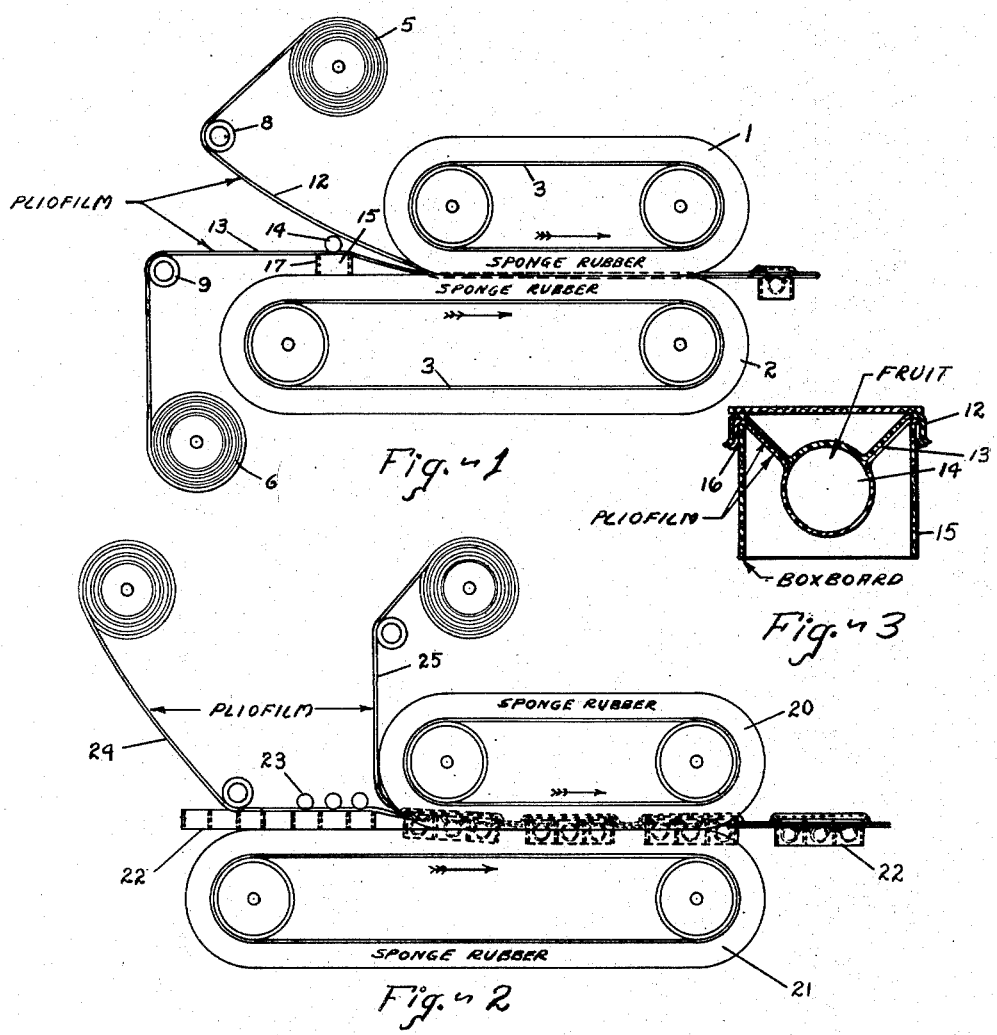
INVENTOR.
CLARENCE M. CARSON
BY R. H. Waters
ATTORNEY Patented Oct. 10, 1950

2,525,649

UNITED STATES PATENT OFFICE 2,525,649

PACKAGING

Clarence M. Carson, Silver Lake, Ohio, assignor to Wingfoot Corporation, Akron, Ohio, a corporation of Delaware Application March 15, 1948, Serial No. 14,890

3 Claims. (Cl. 18—56)

This invention relates to a process of packaging which is particularly adapted to the packaging of soft perishable fruits and vegetables, such as peaches, tomatoes, pears, etc., or frangible articles, such as light bulbs, etc. The object to be packaged is pocketed between two heated plies of thermo-stretchable, heat-sealable wrapping material and is simultaneously cradled in a supporting frame. Many variations in the process will be suggested by reference to the more complete description which follows in which the accompanying drawings are referred to.

In the drawings:

Fig. 1 is a diagrammatic elevation of the equipment for packaging articles as herein described;

Fig. 2 utilizes the same equipment and illustrates diagrammatically a somewhat modified operation; and Fig. 3 is an elevation in section of an article wrapped according to the process illustrated in Fig. 1.

Essentially, the fruit or other article to be wrapped is placed between two sheets of heated wrapping material which are passed between sponge rubber belts or other resilient pressure means together with the frame in which the article is to be cradled. The belts stretch or mold the sheets around the article and preferably also fasten them to the frame. A preferred wrapping material is rubber hydrochloride film, although other films which perform the function of the invention may be used, such as films of vinyl products, polyethylene, and other heat-sealable, thermostretchable plastics, etc.

Fig. 1 comprises two sponge rubber belts 1 and 2, each of which is several inches thick. The sponge rubber may be fastened to any suitable base 3 which is preferably not stretchable, such as cotton, metal or the like. The belts are moved in the direction of the arrows, and at substantially the same speed. Two rolls of Pliofilm (rubber hydrochloride film manufactured by The Goodyear Tire & Rubber Company) 5 and 6 are shown for the purpose of illustration. These films, as they pass from the storage rolls, are heated by contact with the hot rollers 8 and 9 in order to make them sealable and stretchable.

As the two films 12 and 13 enter the bite between the sponge rubber rollers, the article 14, which is a fruit, vegetable or anything else that is to be wrapped, is placed between the two films, and the frame 15 is placed under the bottom film. This frame may be of wood, boxboard, plastic or the like. The article 14 and frame 15 are so arranged that they enter the bite together so that the pressure of the belts will stretch the films around the article and simultaneously push the article down into the frame and seal the edges of the film to it. To insure a strong bond between the films and the frame, the upper edge of the frame is coated with a material 17 to which the heated rubber hydrochloride is adherent. Figs. 1 and 3 illustrate how the film may thus be made to adhere to the top edge of the frame. After being delivered from the belts, excess film will be trimmed from the edges of the box.

Fig. 3 shows a somewhat similar operation but shows the use of multi-cellular frames. Both stock rolls of Pliofilm are located above the sponge rubber belts 20 and 21. The frames 22 each hold three articles 23 and the longitudinal direction and may hold several articles laterally. The articles may be placed in a jig or fixture and carried in this to the correct position between the films 24 and 25. Alternatively, the articles may be fed through tubes to the correct position between the films, and the tubes may be equipped for automatically delivering a single article at a time and simultaneously from each of the tubes.

The two films need not be of the same composition. They may both be plastic but of different stretchability. For instance, the upper film may have a very high modulus so that it is stretched but little, and the sheets may be united near the top of the article. A somewhat similar effect may be produced by using plastic films of the same general composition but by having the lower film thinner and thus more easily stretched than the upper film or by having it plasticized so that it stretches more readily. The elasticity may also be controlled by heating the lower film more than the upper. Thus, the two films may be stretched a different amount as they enclose the article and are pressed down into the frame.

Figs. 3 and 4 show the rim of supporting film between the article and the frame which forms a resilient support which holds each article out of contact with other articles and absorbs shocks to which the package is subjected in transportation. The films fit snugly against the article so that there is no danger of the surface being damaged by abrasion. Furthermore, the article is so supported that although it is able to be moved up and down somewhat as it is jostled about when moved from one place to another, it is not given sufficient play to permit bruising by being bumped on the bottom of the frame.

It is thus seen that the invention is of rather general application and is not limited to the examples given. If the frames are multi-cellular, the films will ordinarily be united only to the outer walls and not to the partitions between the cells. The films may be transparent or pigmented. They may be of any color.

The use of films of different compositions in such a wrapping operation and heating films to different temperatures to impart different elasticity to them is an essential feature of the invention, as brought out in the claims.

Although other heat-sealable, thermostretchable films may be used, rubber hydrochloride film is preferred. This is because other plastics must be maintained in a heated condition to make them sealable and stretchable; but rubber hydrochloride, once heated, may be stretched or sealed by pressure at any time for a considerable period thereafter, even though cooled to about 100° F. Thus, even though the rubber hydrochloride cools appreciably between the heating rolls and the sponge rubber belts, it is stretched and sealed between the belts. Machines designed for use with other heat-sealable and thermostretchable films must be enclosed so as to maintain the films at the required temperature until the stretching and sealing have been completed. The machines may be designed so that the surface speed of the heating rollers is the same as the surface speed of the sponge belts, or faster or slower depending upon whether prestretching or preshrinking of a film already stretched is desired. The apparatus employed may be changed in many respects.

This application is a continuation-in-part of my application Serial No. 693,310, filed August 27, 1946, which has matured into Patent No. 2,438,089, issued March 16, 1948.

What I claim is:

1. The process of packaging an article between two films of thermo-stretchable, heat-sealable wrapping material for the purpose of enclosing the article between one film which is stretched but little and another film which is stretched substantially more in order to retain the advantages inherent in the use of one film which is stretched but little, which comprises heating the films to render them sealable to one another by pressure, and then simultaneously pressing them into contact with opposite surfaces of the article and uniting them around the article, one of the films in being brought into contact with the article as aforesaid having a very high modulus so that it is stretched but little, and the other film being more easily stretched as it is brought into contact with the article as aforesaid and therefore being stretched substantially more than the first mentioned film as the article is being enclosed between the films.

2. The process of packaging an article between two films of thermo-stretchable, heat-sealable wrapping material, which comprises heating the films to different temperatures so that one is rendered more easily stretched than the other, and simultaneously pressing the films into contact with opposite surfaces of the article and uniting them by pressure around the article, one of the films during such pressing having a very high modulus so that it is stretched but little and the other film during such pressing being heated to so much higher temperature that it is more easily stretched than the first mentioned film and during the pressing operation stretching the latter film substantially more than the first mentioned film as the article is enclosed between the films.

3. The process of packaging according to claim 2 in which the first mentioned film of that claim which is the film described as having a very high modulus is above the other film, and after enclosing the article in the films fastening the films to the top of a frame so that the article is suspended in the frames with the films united near the top of the article and the top of the article below the top of the frame.

CLARENCE M. CARSON.

REFERENCES CITED

The following references are of record in the file of this patent:

UNITED STATES PATENTS

| Number | Name | Date |
|---|---|---|
| 1,856,694 | De Correvont | May 3, 1932 |
| 2,156,466 | Vogt | May 2, 1939 |
| 2,210,509 | Strauch | Aug. 6, 1940 |
| 2,232,783 | Hausheer | Feb. 25, 1941 |
| 2,438,089 | Carson | Mar. 16, 1948 |
| 2,484,780 | Clunan et al. | Oct. 11, 1949 |
| 2,486,759 | Pfeiffer | Nov. 1, 1949 |